US010000235B2

(12) United States Patent
Toda et al.

(10) Patent No.: US 10,000,235 B2
(45) Date of Patent: Jun. 19, 2018

(54) STEERING CONTROL DEVICE (71) Applicant: Mitsubishi Electric Corporation, Tokyo (JP)

(72) Inventors: Taizo Toda, Tokyo (JP); Kenji Ogawa, Tokyo (JP); Masaya Endo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/501,261

(22) PCT Filed: Sep. 12, 2014

(86) PCT No.: PCT/JP2014/074249
§ 371 (c)(1),
(2) Date: Feb. 2, 2017

(87) PCT Pub. No.: WO2016/038736
PCT Pub. Date: Mar. 17, 2016

(65) Prior Publication Data
US 2017/0217484 A1    Aug. 3, 2017

(51) Int. Cl.
*B62D 6/00* (2006.01)
*B62D 5/04* (2006.01)
(Continued)

(52) U.S. Cl.
CPC ............ *B62D 6/00* (2013.01); *B62D 5/046* (2013.01); *B62D 6/02* (2013.01); *B62D 6/10* (2013.01)

(58) Field of Classification Search
CPC . B62D 6/00; B62D 5/046; B62D 6/02; B62D 6/10; B62D 5/0472; B62D 5/0463; B62D 515/021; B62D 5/0412
(Continued)

(56) References Cited

U.S. PATENT DOCUMENTS 5,732,373 A * 3/1998 Endo .................... B62D 5/0463
180/443
2004/0162655 A1 * 8/2004 Patankar ............. B62D 5/0463
701/41
(Continued)

FOREIGN PATENT DOCUMENTS

JP    61-115771 A    6/1986
JP    05-155351 A    6/1993
(Continued)

OTHER PUBLICATIONS

International Search Report of PCT/JP2014/074249 dated Dec. 16, 2014 [PCT/ISA/210].

*Primary Examiner* — Shardul D Patel
(74) *Attorney, Agent, or Firm* — Sughrue Mion, PLLC; Richard C. Turner (57) ABSTRACT

The steering control device includes: current command value 1 calculation unit 11 which determines current command value 1 based on a vehicle speed and a steering torque; current command value 2 calculation unit 14 which determines current command value 2 based on a filtered differential value of the steering torque; and current drive unit 10 which drives motor 5 so that the value of the motor current matches the sum of current command values 1 and 2. When a first crossover frequency represents the crossover frequency of control open loop characteristics in the steering control device as obtained when current command value 2 is determined using a differential value of the steering torque which has not been filtered, the notch frequency of the notch filter is set to be greater than the mechanical resonance frequency of the steering control device and smaller than the first crossover frequency.

7 Claims, 9 Drawing Sheets

(51) Int. Cl.
*B62D 6/02* (2006.01)
*B62D 6/10* (2006.01)

(58) Field of Classification Search
USPC ...... 701/41, 42, 44; 303/100, 106, 103, 109;
364/426.1, 424.05; 180/142, 79.1, 446;
318/432, 430, 488
See application file for complete search history.

(56) References Cited

U.S. PATENT DOCUMENTS

| | | | | |
|---|---|---|---|---|
| 2007/0118262 | A1* | 5/2007 | Nishizaki | B62D 5/0472 701/41 |
| 2007/0198153 | A1* | 8/2007 | Oya | B62D 5/0463 701/41 |
| 2007/0205041 | A1* | 9/2007 | Nishizaki | B62D 5/0472 180/446 |
| 2008/0277192 | A1* | 11/2008 | Nishimura | B62D 5/0463 180/444 |
| 2012/0290176 | A1* | 11/2012 | Murakami | B62D 5/0463 701/42 |
| 2013/0238193 | A1* | 9/2013 | Bolourchi | B62D 5/0463 701/42 |
| 2014/0058630 | A1* | 2/2014 | Kezobo | B62D 5/0472 701/42 |
| 2016/0031477 | A1* | 2/2016 | Kimpara | B62D 5/0463 701/41 |

FOREIGN PATENT DOCUMENTS

| | | | |
|---|---|---|---|
| JP | 08-290778 | A | 11/1996 |
| JP | 10-324262 | A | 12/1998 |
| JP | 2005-104403 | A | 4/2005 |
| JP | 2008-273474 | A | 11/2008 |
| JP | 2010-111254 | A | 5/2010 |
| JP | 2010-234977 | A | 10/2010 |
| JP | 2014-040246 | A | 3/2014 |
| JP | 2014-061884 | A | 4/2014 |
| WO | 2005/085041 | A1 | 9/2005 |
| WO | 2005/108187 | A1 | 11/2005 |

* cited by examiner

STEERING CONTROL DEVICE

CROSS REFERENCE TO RELATED APPLICATIONS

This application is a National Stage of International Application No. PCT/JP2014/074249, filed Sep. 12, 2014, the contents of which are incorporated herein by reference in its entirety.

TECHNICAL FIELD

This invention relates to a steering control device, and more particularly to a steering control device which assists steering of a vehicle by a driver.

BACKGROUND ART

For example, in a conventional steering control device described in PTL 1, firstly, a current command value 1 is calculated from a steering torque after phase compensation (the sum of a steering torque and a signal proportional to the differential of the steering torque) with a graph of the characteristics of a motor current command value in the assist direction. Furthermore, a current command value 2 is calculated from a signal proportional to the differential of the steering torque. In this way, motor assist control is carried out on the basis of the sum of the current command value 1 and the current command value 2.

In the conventional steering control device described in PTL 1, self-induced vibration is prevented by calculating the current command value 1 from the steering torque after phase compensation. Furthermore, the effects of the motor inertia are suppressed by calculating the current command value 2 from a signal proportional to the differential of the steering torque.

Although not described in PTL 1, the current command value 2 calculated from the signal proportional to the differential of the steering torque also has an effect of suppressing the transmission, to the driver, of road surface vibrations produced when travelling over bad roads, etc.

CITATION LIST

Patent Literature

[PTL 1] Japanese Patent Application Publication No. S61-115771 (page 3, FIG. 1)

SUMMARY OF INVENTION

Technical Problem

In the conventional steering control device described above, the phase margin at the crossover frequency of the open loop characteristics of the steering control device is improved by calculating the current command value 1 from the steering torque after phase compensation. As a result, the stability of the control system is improved and self-induced vibration can be suppressed. However, adding the current command value 2 alters the open loop characteristics near the crossover frequency. Therefore, problems such as the following have arisen.
  The stability of the control system becomes worse.
  Self-induced vibration occurs.
  Road surface vibrations near the crossover frequency become liable to be transmitted.

Therefore, it is necessary to design the phase compensation such that the open loop characteristics are stable, including both the current command value 1 and the current command value 2, and therefore a problem arises in that the design becomes complex. In particular, when the current command value 2 is changed, the phase compensation needs to be redesigned, and hence there is a problem in that design work time is increased to change the current command value 2 and to select whether or not the current command value 2 is to be used.

This invention was devised in order to resolve this problem, an object thereof being to provide a steering control device wherein decline in the stability of a control system can be suppressed, and changing of a current command value 2 and selection of whether or not to use the current command value 2 can be carried out easily, in cases where a current command value 2 calculated from the differential value of the steering torque is added to a current command value 1.

Solution to Problem

The present invention is a steering control device for assisting steering of a steering wheel of a vehicle by a driver, the steering control device comprising: a steering torque detection unit which detects a steering torque of the steering wheel; a vehicle speed detection unit which detects a vehicle speed of the vehicle; a motor which applies a steering assistance force to the steering wheel; a first current command value calculation unit which calculates a first current command value for the motor on the basis of the steering torque detected by the steering torque detection unit and the vehicle speed detected by the vehicle speed detection unit; a steering torque differentiation unit which calculates a differential value of the steering torque detected by the steering torque detection unit; a notch filter processing unit which has a notch filter and filters the differential value of the steering torque by using the notch filter; a second current command value calculation unit which calculates a second current command value for the motor, on the basis of the filtered differential value of the steering torque; and a current drive unit which drives the motor in such a manner that a value of a current flowing in the motor matches the sum of the first current command value and the second current command value, wherein, when a first crossover frequency represents the crossover frequency of control open loop characteristics of the steering control device as obtained when the second current command value calculation unit determines the second current command value by using a differential value of the steering torque which has not been filtered, instead of a differential value of the steering torque which has been filtered, a notch frequency of the notch filter is set to be larger than a mechanical resonance frequency of the steering control device and smaller than the first crossover frequency.

Advantageous Effects of Invention

The steering control device according to the present invention, when filtering the differential value of the steering torque with a notch filter, filters it with a notch filter having a notch frequency set to a value higher than the mechanical resonance frequency of the steering control device and lower than the crossover frequency of the open loop characteristics, and calculates a current command value 2 from the signal obtained from this filtering process. By carrying out a notch filtering process, it is possible to achieve the prominent beneficial effects, which are not available in the prior art, of suppressing decline in the stability of the control system and facilitating change of the current command value 2 and selection of whether or not to use the current command value 2, when a current command value 2 is added to a current command value 1.

DESCRIPTION OF EMBODIMENTS

First Embodiment

Figure 1:
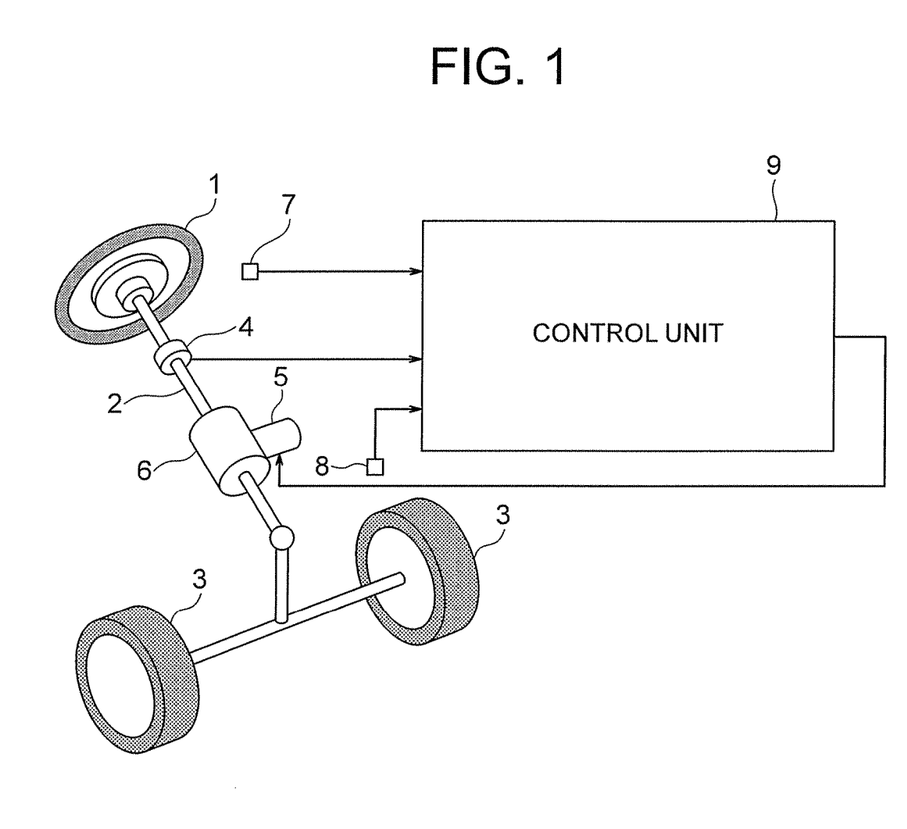
FIG. 1 is a schematic drawing showing a steering control device according to a first embodiment of this invention.

FIG. 1 is a schematic drawing showing a steering control device according to a first embodiment of this invention. As shown in FIG. 1, a steering shaft 2 is coupled to a steering wheel 1. A pair of turning wheels 3 are coupled to the steering shaft 2 via tie rods. When the driver operates the steering wheel 1, the left and right turning wheels 3 are turned in accordance with the rotation of the steering shaft 2 which is coupled to the steering wheel 1. A torque sensor 4 is disposed on the steering shaft 2 and detects the steering torque acting on the steering shaft 2. A motor 5 is coupled to the steering shaft 2 via a speed reduction mechanism 6, and a steering assistance torque generated by the motor 5 can be applied to the steering shaft 2. Furthermore, the vehicle speed of the vehicle is detected by a vehicle speed sensor 7. The current flowing in the motor 5 is detected by the current sensor 8.

A control unit 9 controls the motor 5 by calculating the steering assistance torque to be generated by the motor 5 and determining, as a current command value, the current required in the motor 5 in order to generate the steering assistance torque. The control unit 9 is provided with a microcomputer having a memory including a ROM and RAM, and a current drive unit 10 (not illustrated in FIG. 1, see FIG. 2) which drives the motor current in such a manner that the current flowing in the motor 5 matches a current command value corresponding to the steering assistance torque.

Next, the configuration and operation of the control unit 9, which is the main part of the present invention, will now be described with reference to the block diagram shown in FIG. 2 and the flowchart shown in FIG. 3. The operation shown in the flowchart is carried out repeatedly at a previously established uniform cycle.

The configuration of the control unit 9 is now described. As shown in FIG. 2, the control unit 9 is configured from a current drive unit 10, a current command value 1 calculation unit 11, a differentiator 12, a notch filter processing unit 13, a current command value 2 calculation unit 14 and an adder 15.

The current command value 1 calculation unit 11 (first current command value calculation unit) receives input of the vehicle speed detected by the vehicle speed sensor 7, and the steering torque detected by the torque sensor 4. The current command value 1 calculation unit 11 calculates the current command value 1 on the basis of the vehicle speed and the steering torque. The current command value 1 is a motor current command value for generating a steering assistance torque which is generated by the motor 5 in order to assist the steering by the driver. The method for calculating the current command value 1 is described below.

The differentiator 12 calculates a differential value of the steering torque detected by the torque sensor 4.

The notch filter processing unit 13 has a notch filter. The notch filter processing unit 13 filters the differential value of the steering torque output from the differentiator 12, with the notch filter.

The current command value 2 calculation unit 14 (second current command value calculation unit) receives input of the vehicle speed detected by the vehicle speed sensor 7, and the differential value of the steering torque which has been filtered by the notch filter processing unit 13. The current command value 2 calculation unit 14 calculates the current command value 2 on the basis of the vehicle speed and the filtered differential value of the steering torque. The method for calculating the current command value 2 is described below. The current command value 2 calculation unit 14 may determine the current command value 2 by using only the filtered differential value of the steering torque, without using the vehicle speed.

The adder 15 adds the current command value 1 calculated by the current command value 1 calculation unit 11 and the current command value 2 calculated by the current command value 2 calculation unit 14 to calculate a current command value for the motor 5.

The current drive unit 10 receives input of the current command value from the adder 15 and the current value of the motor 5 which is detected by the current sensor 8. The current drive unit 10 drives the current flowing in the motor 5 in such a manner that the current value in the motor 5 matches the current command value.

Next, the operation of the control unit 9 will be described on the basis of the flowchart in FIG. 3.

In step S1, the vehicle speed V is detected by the vehicle speed sensor 7. Furthermore, the steering torque Thd1 is detected by the torque sensor 4.

In step S2, the current command value 1 is calculated from the vehicle speed and the steering torque, in the current command value 1 calculation unit 11. The current command value 1 calculation unit 11 may also use status information about the vehicle from other sensors, as well as the vehicle speed and the steering torque, when determining the current command value 1. The current command value 1 is a motor current command value for generating a motor torque (steering assistance torque) which assists the steering by the driver. The current command value 1 may be calculated by the following well-known feature of a steering control device. For example, as shown in FIG. 4, an assist map which defines the relationship between the steering torque Thd1, the vehicle speed V and the current command value 1 for the motor 5 is prepared in advance. The current command value 1 corresponding to the steering torque Thd1 and the vehicle speed V is read out from this assist map, and taken as a basic assist command value. Generally, as shown in FIG. 4, this assist map is defined as a second-order function such that, the greater the steering torque Thd1, the larger the current command value 1 and the larger the gradient. Furthermore, the map is defined in such a manner that that current command value 1 becomes smaller, the greater the vehicle speed V. FIG. 4 shows two types of map, for "low" vehicle speed and for "high" vehicle speed. In this case, appropriate settings are used, for example, "low speed" is set to a range of no less than 0 km/h and less than 30 km/h, and "high speed" is set to a range of no less than 30 km/h. Furthermore, the invention is not limited to this case, and an assist map may also be created for three or more types of vehicle speed V. In this case, for example, "low speed" is in a range from no less than 0 km/h to less than 10 km/h, "medium speed 1" is in a range from no less than 10 km/h to less than 30 km/h, "medium speed 2" is in a range from no less than 30 km/h to less than 60 km/h, and "high speed" is in a range of no less than 60 km/h. The ranges into which the vehicle speed is divided may be fixed intervals in this way or may be variable.

In the present embodiment, similarly to PTL 1, phase compensation is applied to the steering torque Thd1 input to the assist map, thereby ensuring the stability of the control system of the steering control device. The technique for ensuring the stability of the control system based on application of the current command value 1 is not limited to a simple phase compensation process, and the stability may be ensured by a well-known technique.

In step S3, the differential value of the steering torque is calculated in the differentiator 12. The method for calculating the differential may involve calculation from the difference with respect to the previous value, or a pseudo-differentiation calculation based on high-pass filtering. The cut-off frequency of the high-pass filter is set to be greater than the mechanical resonance frequency of the steering control device (approximately 10 Hz), and greater than the frequency of the road surface vibrations that are not to be transmitted to the driver.

In step S4, the differential value of the steering torque is filtered by the notch filter in the notch filter processing unit 13. The notch filter uses a filter which is expressed by equation (1), which is a second-order expression.

$$H(s) = \frac{s^2 + 2\zeta_1\omega_1 s + \omega_1^2}{s^2 + 2\zeta_2\omega_1 s + \omega_1^2} \quad (1)$$

Here, $\omega_1$ is the notch frequency, $\zeta_1$ is the numerator-side attenuation ratio (numerator-side damping ratio), $\zeta_2$ is the denominator-side attenuation ratio (denominator-side damping ratio), and these three parameters are the design parameters of the notch filter. s is a Laplace operator.

The notch depth is adjusted on the basis of the value of $\zeta_2/\zeta_1$, and the notch width is adjusted on the basis of the magnitude of $\zeta_1$.

Here, the notch frequency $\omega_1$ is set to be greater than the mechanical resonance frequency (approximately 10 Hz) of the steering control device, and smaller than the crossover frequency of the open loop characteristics of the steering control device.

Furthermore, for example, $\zeta_1$ is set to 0.1 and $\zeta_2$ is set to 1. In other words, the notch depth is 10. The invention is not limited to this, and $\zeta_1$ and $\zeta_2$ are adjusted in accordance with the open loop characteristics.

Figure 5:
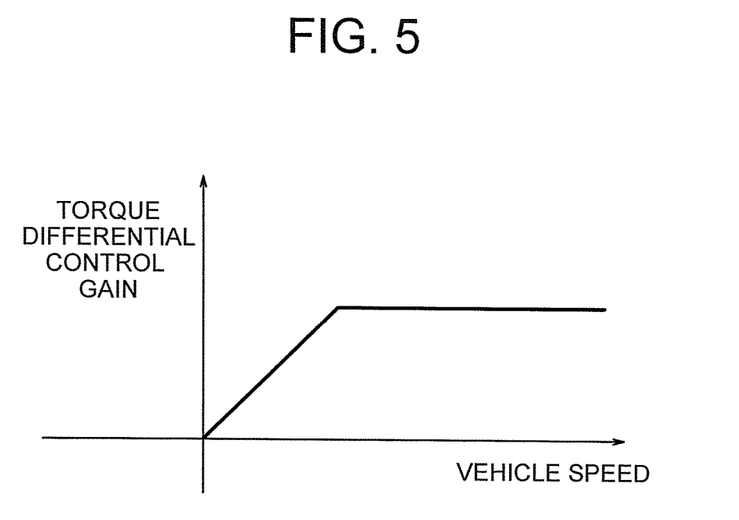
FIG. 5 is a diagram showing a map of torque differential control gain against vehicle speed according to the first embodiment of the invention.

In step S5, in the current command value 2 calculation unit 14, the filtered differential value of the steering torque is used to calculate a current command value 2 which is directly proportional to the differential value of the steering torque. Here, the vehicle speed detected by the vehicle speed sensor 7 is also used, in addition to the filtered differential value of the steering torque, to calculate the current command value 2. In other words, a torque differential control gain based on the vehicle speed is determined, and the current command value 2 is calculated on the basis of the torque differential control gain and the filtered differential value of the steering torque. The method for calculating the current command value 2 is now described. For example, as shown in FIG. 5, a torque differential control gain map for determining the relationship between the vehicle speed V and the torque differential control gain is created in advance. In the example in FIG. 5, in the region where the vehicle speed is low (in the range from 0 to a predetermined speed), the torque differential control gain increases in direct proportion to the increase in the vehicle speed, but in the region where the vehicle speed is faster than this (in the range of speeds faster than the predetermined speed), the torque differential control gain is a uniform value. In step S5, firstly, a torque differential control gain corresponding to the vehicle speed V is read out from the torque differential control gain map. The current command value 2 is obtained by multiplying the torque differential control gain that has been read out, by the differential value of the steering torque after notch filtering. In this way, by changing the torque differential control gain in accordance with the vehicle speed, it is possible to supress transmission, to the driver, of road surface vibrations which become more or less liable to be transmitted depending on the vehicle speed. Furthermore, the upper limit value and lower limit value of the calculated current command value 2 may be restricted to predetermined values.

In step S6, the current command value 1 and the current command value 2 are added together in the adder 15 to obtain a current command value.

In step S7, the current is driven by the current drive unit 10 in such a manner that the current in the motor 5 matches the current command value. Consequently, the motor 5 generates an assist torque which corresponds to the current command value.

Next, the beneficial effects of the steering control device according to the present embodiment will be described.

Figure 6:
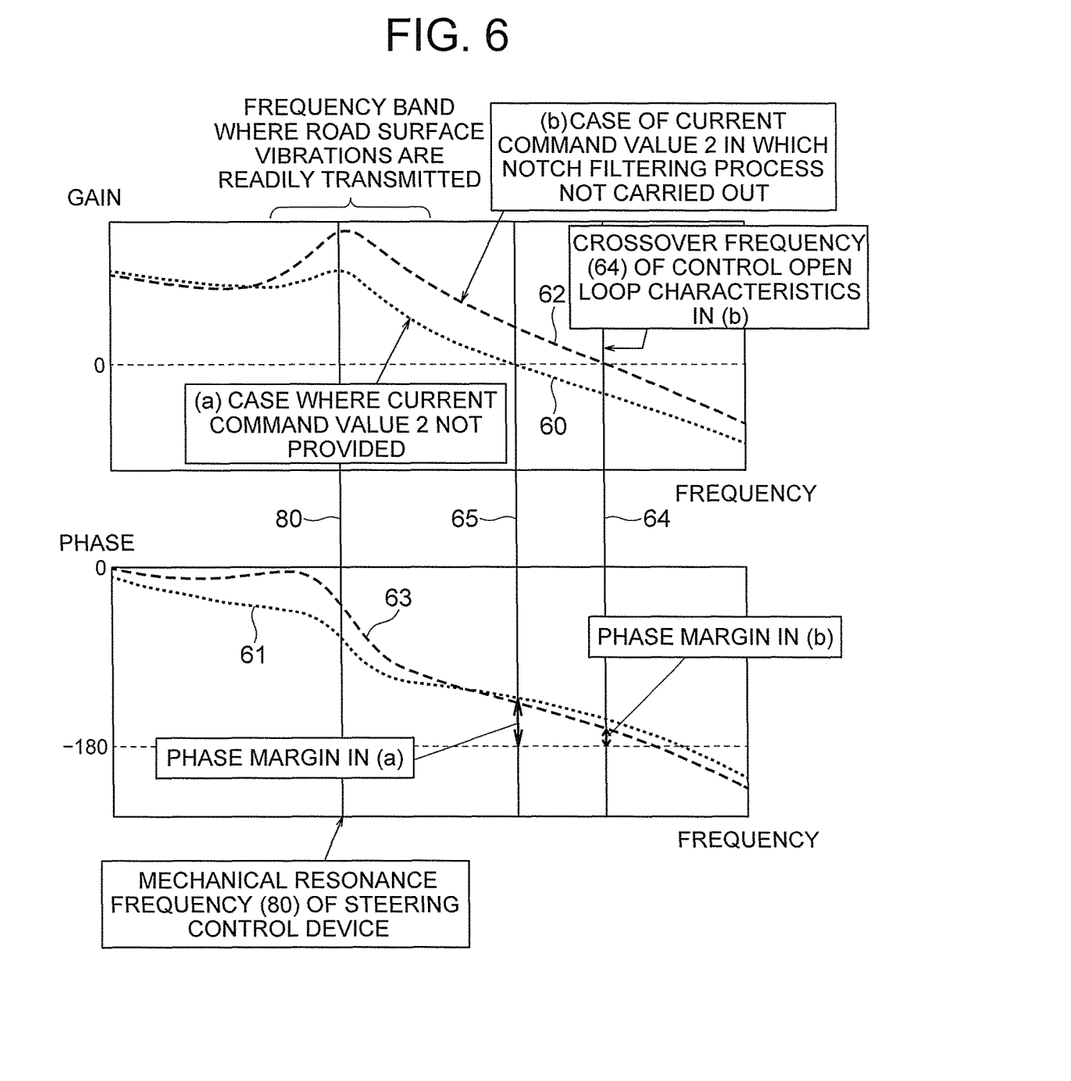
FIG. 6 shows the control open loop characteristics when a notch filter process is not carried out according to the first embodiment of the invention.

FIG. 6 shows the control open loop characteristics when a notch filtering process is not carried out. The control open loop in FIG. 6 is a control open loop from the current command value input to the current drive unit 10, to the current command value 1 output by the adder 15. FIG. 6 shows a case where a notch filtering process is not carried out, and therefore the configuration of the steering control device omits the notch filter processing unit 13 from the configuration in FIG. 2. Consequently, the current command value 2 calculation unit 14 uses the differential value of the steering torque output from the differentiator 12, instead of the filtered differential value of the steering torque, to calculate the current command value 2. The other operations are the same as those described above. The upper diagram in FIG. 6 shows the relationship between frequency and gain. The lower diagram in FIG. 6 shows the relationship between frequency and phase. In FIG. 6, the broken lines 62, 63 indicate the control open loop characteristics when applying a current command value 2 in which a notch filtering process has not been carried out. Below, this case is called "(b) a case of applying a current command value 2 in which a notch filtering process has not been carried out".

Furthermore, in FIG. 6, dotted lines 60 and 61 are the control open loop characteristics when the current command value 2 is not used. Below, this case is called "(a) a case where a current command value 2 is not used". This indicates the control open loop characteristics when the current drive unit 10 drives the motor 5 by using only the current command value 1 output from the current command value 1 calculation unit 11 in FIG. 2. The configuration of the steering control device in this case omits the differentiator 12, the notch filter processing unit 13 and the current command value 2 calculation unit 14, from the configuration in FIG. 2.

Moreover, in FIG. 6, 64 is the crossover frequency of the control open loop characteristics of "(b) a case of applying a current command value 2 in which a notch filtering process has not been carried out". The crossover frequency is the frequency value when the gain is zero. 65 is the crossover frequency of the control open loop characteristics in "(a) a case where a current command value 2 is not used".

Figure 2:
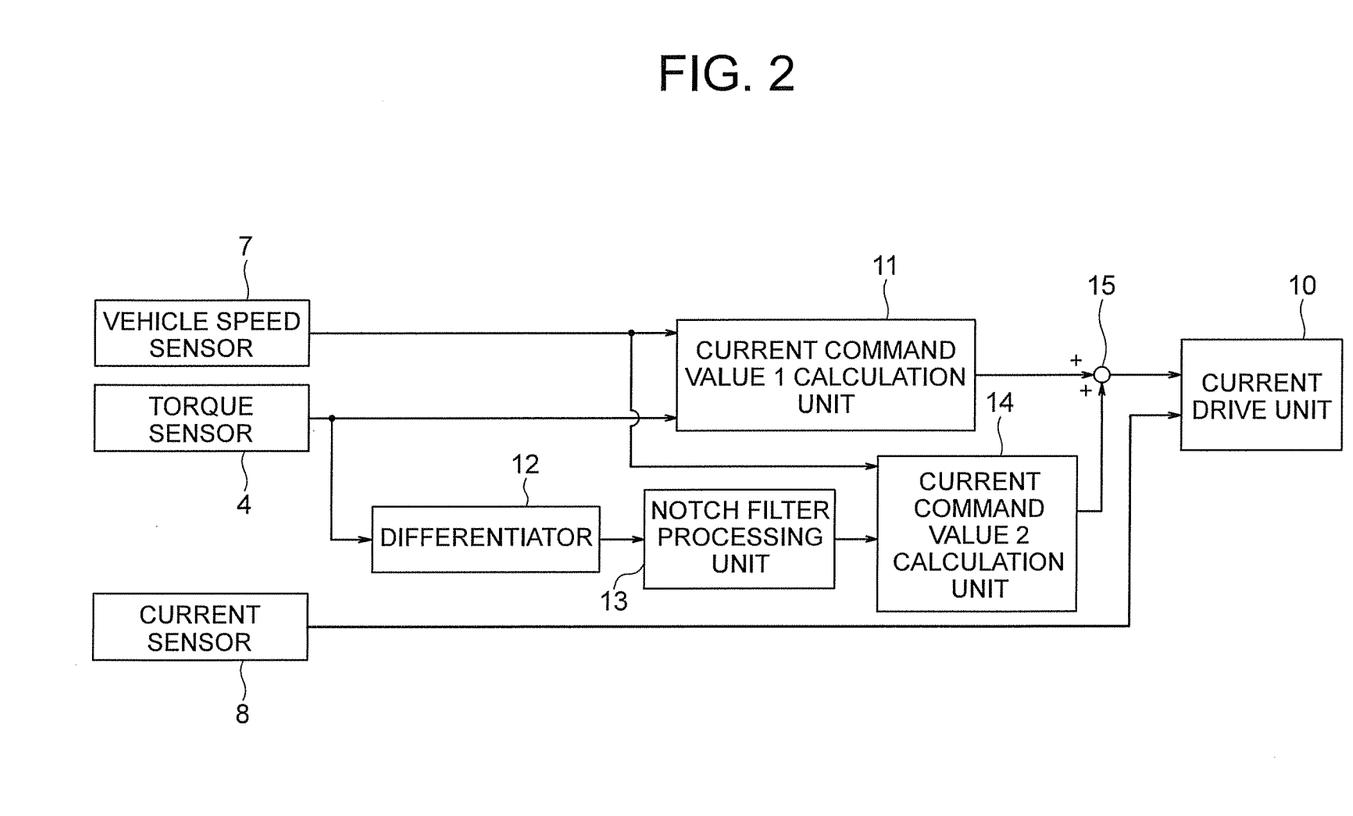
FIG. 2 is a block diagram showing a principal part of a steering control device according to the first embodiment of the invention.
Figure 7:
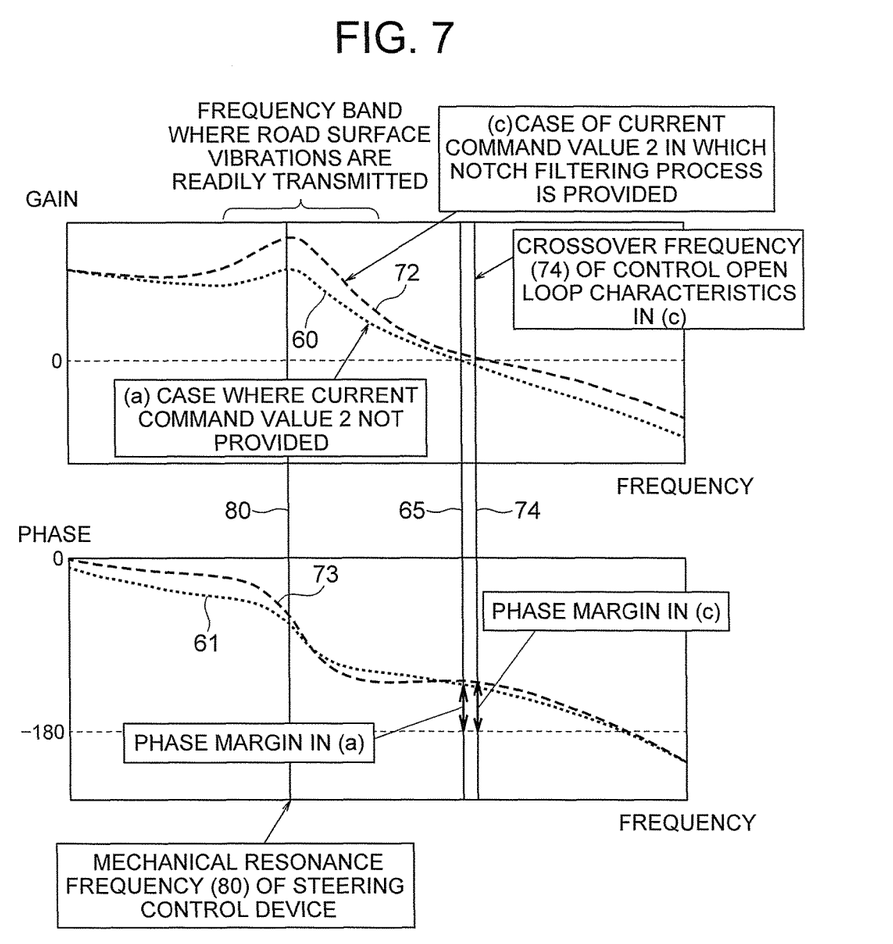
FIG. 7 shows the control open loop characteristics when a notch filter process is carried out according to the first embodiment of the invention.

FIG. 7 shows the control open loop characteristics when a notch filtering process has been carried out according to the present embodiment which includes the configuration shown in FIG. 2. The control open loop in FIG. 7 is a control open loop from the current command value input to the current drive unit 10, to the current command value 1 output by the adder 15. The upper diagram in FIG. 7 shows the relationship between frequency and gain. The lower diagram in FIG. 7 shows the relationship between frequency and phase.

In FIG. 7, dotted lines 60, 61 show the control open loop characteristics for "(a) a case where a current command value 2 is not used", similarly to FIG. 6.

Solid lines 72 and 73 show the control open loop characteristics in the case of applying a current command value 2 in which a notch filtering process has been carried out according to the present embodiment. Below, this case is called "(c) a case of applying a current command value 2 in which a notch filtering process has been carried out".

In FIG. 7, 74 is the crossover frequency of the control open loop characteristics of "(c) a case of applying a current command value 2 in which a notch filtering process has been carried out".

Figure 8:
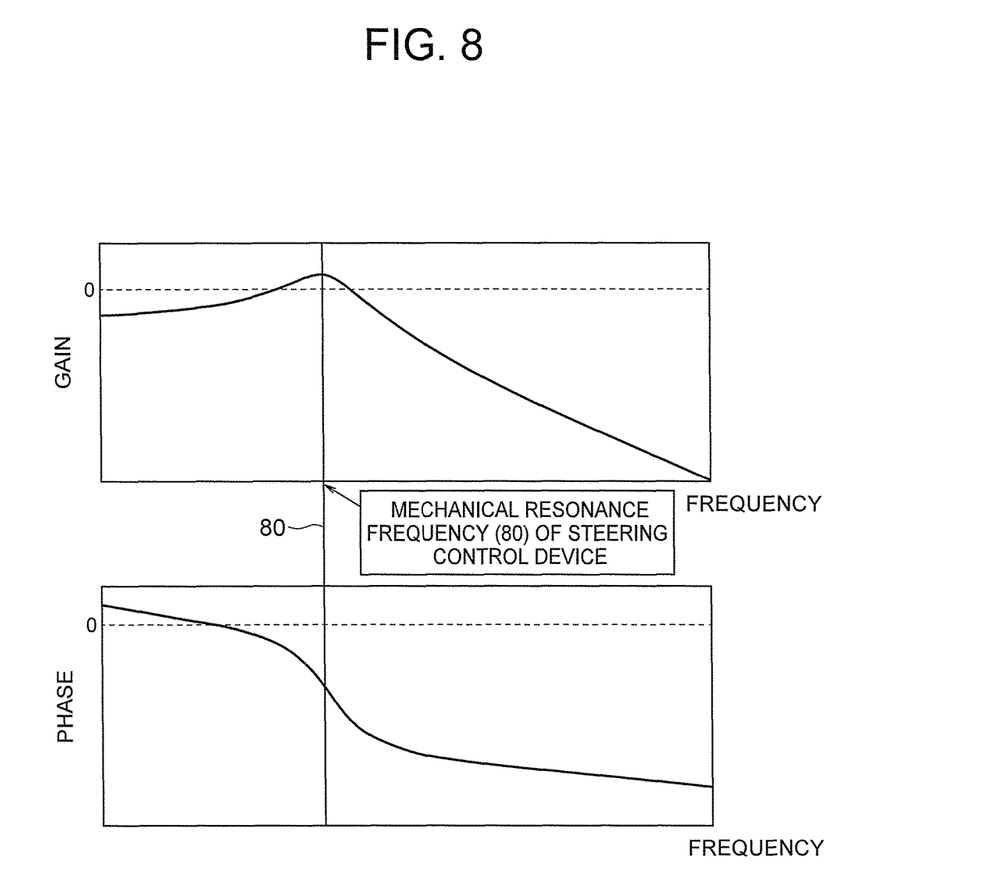
FIG. 8 shows the mechanical resonance frequency of the steering control device according to the first embodiment of the invention.

FIG. 8 shows the mechanical resonance frequency of the steering control device. In FIG. 8, the solid line 80 is the mechanical resonance frequency of the steering control device. Below, this frequency is called the "mechanical resonance frequency (80) of the steering control device". This mechanical resonance frequency indicates the frequency of the resonance mode, which is generated by the torsional stiffness of the torque sensor 4, the inertial moment of the steering wheel 1, and the inertial moment of the motor 5. In FIG. 6 and FIG. 7, this resonance frequency is also indicated by the solid line 80. As shown in FIG. 6 and FIG. 7, the gain peak corresponds to "the mechanical resonance frequency (80) of the steering control device". The "mechanical resonance frequency (80) of the steering control device" is approximately 10 Hz.

Figure 9:
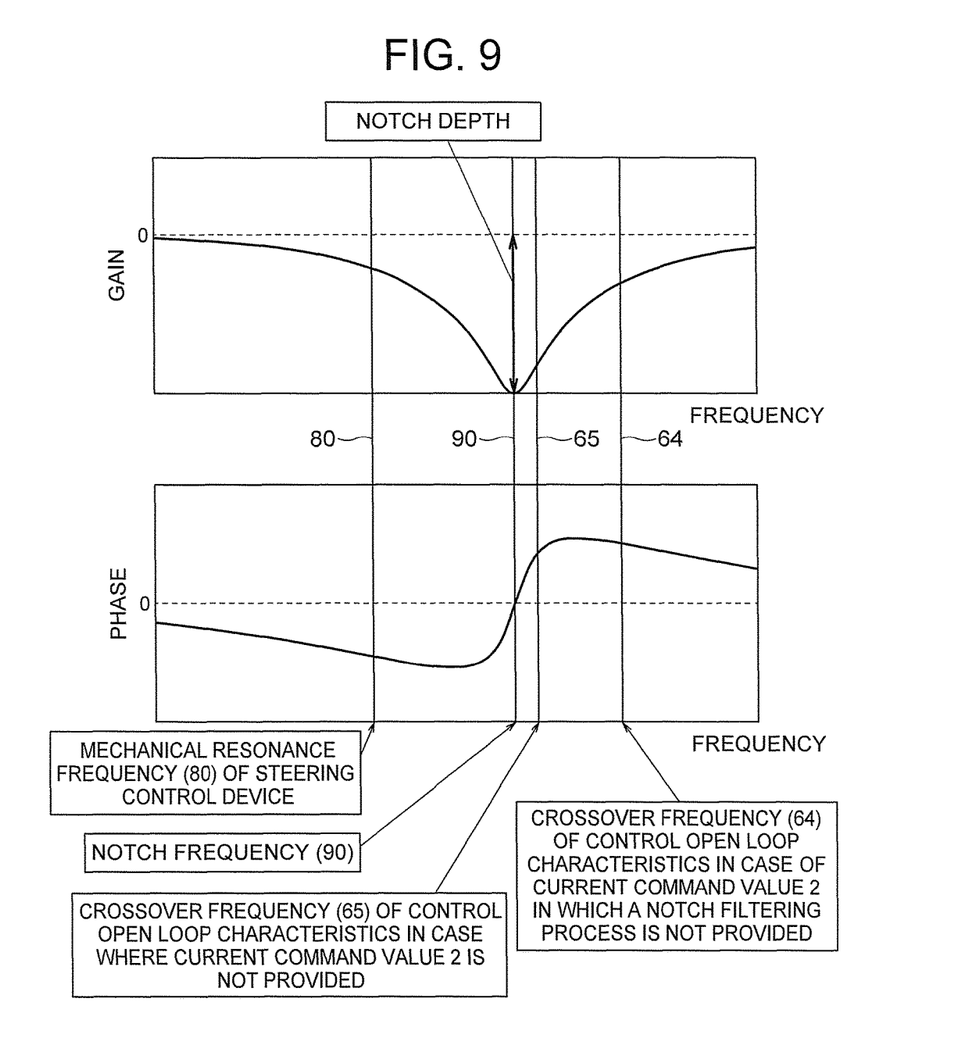
FIG. 9 shows the frequency characteristics of a notch filter according to the first embodiment of the invention.

Next, FIG. 9 shows the frequency characteristics of the notch filter according to the present embodiment. In FIG. 9, the solid line 90 indicates the notch filter frequency. Below, the notch filter frequency 90 is called "notch frequency (90)". In the present embodiment, as shown in FIG. 9, the "notch frequency (90)" is set to a range greater than the "mechanical resonance frequency (80) of the steering control device", and smaller than the crossover frequency (solid line 64) of the control open loop characteristics in "(b) a case of applying a current command value 2 in which a notch filtering process has not been carried out".

As illustrated in the upper diagram in FIG. 6, in "(b) a case of using a current command value 2 in which a notch filtering process has not been carried out" which is indicated by the broken line 62, the gain is increased in the region of 8 to 20 Hz which includes the "mechanical resonance frequency (80) of the steering control device", compared to "(a) a case where a current command value 2 is not used" which is indicated by the dotted line 60. This region of 8 to 20 Hz, which includes the "mechanical resonance frequency (80) of the steering control device" is a frequency band where the road surface vibrations generated when travelling over a bad road, etc. are readily transmitted. Consequently, it is possible to reduce the road surface vibrations in this frequency band, by increasing the gain in this region. However, as shown in the lower diagram in FIG. 6, the phase margin in "(b) a case of using a current command value 2 in which a notch filtering process has not been carried out", which is indicated by the broken line 63, is smaller than the phase margin in "(a) a case where a current command value 2 is not used", which is indicated by dotted line 61, and the stability of control is worse, and hence the road surface vibrations near the crossover frequency become liable to be transmitted.

Consequently, it is necessary to carry out a notch filtering process, and it is necessary to set the notch frequency to a suitable range. In the present embodiment, as shown in FIG. 9, the "notch frequency (90)" of the notch filter is set to be greater than the "mechanical resonance frequency (80) of the steering control device", and smaller than the crossover frequency (solid line 64) in "(b) a case of using a current command value 2 in which a notch filtering process has not been carried out". Consequently, as shown in the lower diagram in FIG. 7, the phase margin in (c) can be made larger than the phase margin in "(b) a case of using a current command value 2 in which a notch filtering process has not been carried out" in FIG. 6. In this way, in the present embodiment, the phase margin can be made larger while increasing the gain in the frequency band where road surface vibrations produced when travelling on a bad road, etc. are readily transmitted, compared to "(a) a case where a current command value 2 is not used", and the stability of the control system is improved compared to "(b) a case of using a current command value 2 in which a notch filtering process has not been carried out". This has the beneficial effects indicated by (1) and (2) below.

(1) Due to the effect of sudden reduction of the gain at the notch frequency, which is a characteristic feature of the notch filter properties, the crossover frequency after application of the notch filtering process is lowered.

(2) Due to the effect of advance in the phase at frequencies higher than the notch frequency, which is a characteristic feature of the notch filter properties, the phase near the crossover frequency after application of the notch filtering process is advanced.

If the "mechanical resonance frequency (80) of the steering control device" to which the notch filter is generally applied is set as the notch frequency (90) of the notch filter, then since this frequency diverges from the crossover frequency of the control open loop characteristics in "(b) a case of applying a current command value 2 in which a notch filtering process has not been carried out" which is indicated by the solid line 64, then the effect of advancing the phase is not obtained. Therefore, it is not possible to improve the stability of the control. Moreover, since the gain is reduced in the frequency band where road surface vibrations produced when travelling on a bad road, etc. are readily transmitted, then the road surface vibrations become liable to be transmitted.

Moreover, a phase advancing filter is generally used as a filtering process for advancing the phase, but in this case, the high-frequency gain is increased, and therefore the device becomes more susceptible to the effects of noise on the torque sensor, etc., and hence there may be problems with regard to noise, i.e., undesirable mechanical sounds etc. By adopting a design which avoids increase in gain at high frequencies in the notch filter, the high-frequency gain of the control open loop characteristics is unchanged. As a result of this, the effects of noise on the torque sensor, etc. can be reduced.

The attenuation ratios $\zeta_1$, $\zeta_2$ in Equation (1) may vary with the vehicle speed V, and the depth or width of the notch filter may be changed in accordance with the vehicle speed V. By narrowing the width of the notch filter or increasing the depth of the notch filter, the characteristics of the notch filter can be made steeper and the frequency characteristics can be corrected in a more restricted frequency region.

Moreover, as shown in FIG. 9, by setting the notch frequency 90 to a frequency smaller than the crossover frequency of the control open loop characteristics in "(b) a case of applying a current command value 2 in which a notch filtering process has not been carried out" which is indicated by the solid line 64, and within ±5 Hz of the crossover frequency of the control open loop characteristics in "(a) a case where a current command value 2 is not used" which is indicated by the solid line 65, an effect in achieving even greater stability is obtained.

As described above, the present embodiment adopts a configuration which improves stability by carrying out an easily applicable notch filtering process on the current command value 2, and therefore the current command value 2 can be applied readily to the current command value 1, and the adjustment required in the case of applying the current command value 2 can be reduced.

The steering control device according to the present embodiment includes: a torque sensor 4 (steering torque detection unit) which detects a steering torque of a steering wheel 1; a vehicle speed sensor 7 (vehicle speed detection unit) which detects the vehicle speed of a vehicle; a motor 5 which applies a steering assistance force to the steering wheel 1; a current command value 1 calculation unit 11 (first current command value calculation unit) which calculates a current command value 1 for the motor 5 (first current command value) on the basis of the steering torque detected by the torque sensor 4 and the vehicle speed detected by the vehicle speed sensor 7; a differentiator 12 (steering torque differentiation unit) which calculates a differential value of the steering torque detected by the torque sensor 4; a notch filter processing unit 13 which has a notch filter and filters the differential value of the steering torque, by using the notch filter; a current command value 2 calculation unit 14 (second current command value calculation unit) which calculates a current command value 2 (second current command value) for the motor 5, on the basis of the filtered differential value of the steering torque; and a current drive unit 10 which drives the motor 5 in such a manner that the value of the current flowing in the motor 5 matches the sum of current command value 1 and current command value 2, wherein when a first crossover frequency represents the crossover frequency (64) of the control open loop characteristics of the steering control device as obtained when the current command value 2 calculation unit 14 determines the current command value 2 by using a differential value of the steering torque which has not been filtered, instead of a differential value of the steering torque which has been filtered, the notch frequency of the notch filter is set to be larger than the mechanical resonance frequency (80) of the steering control device and smaller than the first crossover frequency (64). Accordingly, decline in stability near the crossover frequency 74 due to the application of the current command value 2 is suppressed, and it is possible to suppress deterioration of external vibrations near the crossover frequency 74. Furthermore, when a phase advance compensator is used, rather than notch characteristics, the high-frequency gain is raised and the device becomes more susceptible to the effects of noise, but the notch characteristics do not raise the gain at or above the notch frequency, and therefore, the effects of noise can be suppressed. Since a configuration which processes the current command value 2 to improve stability is adopted, then application to the current command value 1 is made easier and the adjustment and reworking required can be reduced.

Furthermore, in the present embodiment, since the notch filter has a second-order function, decline in stability near the crossover frequency due to addition of the current command value 2 can be suppressed, and deterioration of the external vibrations near the crossover frequency can be suppressed.

Moreover, when a phase advance compensator is used, rather than notch characteristics, the high-frequency gain is raised and the device becomes more susceptible to the effects of noise, but the notch characteristics do not raise the gain at or above the notch frequency, and therefore, the effects of noise can be suppressed. Since a configuration which processes the current command value 2 to improve stability is adopted, then application to the current command value 1 is made easier and the adjustment and reworking required can be reduced.

Moreover, in the present embodiment, the current command value 2 calculation unit 14 calculates the current command value 2 by also using the vehicle speed detected by the vehicle speed sensor 7, in addition to the filtered differential value of the steering torque, and therefore it is possible to adjust the disturbance suppressing characteristics, in accordance with the vehicle speed. By reducing the current command value 2 in a region where the steering speed is fast, it is possible to supress change in the steering torque when fast steering is performed.

Second Embodiment

The overall configuration and operation of the steering control device according to the second embodiment are the same as the first embodiment described above, and therefore an explanation thereof is omitted here. Furthermore, the configuration which is common to the first embodiment uses the same reference numerals. Below, the description centers on the operation of the current command value 2 calculation unit 14, which differs from the first embodiment. The operation of the current command value 2 calculation unit 14 is described by the flowchart shown in FIG. 10.

Figure 3:
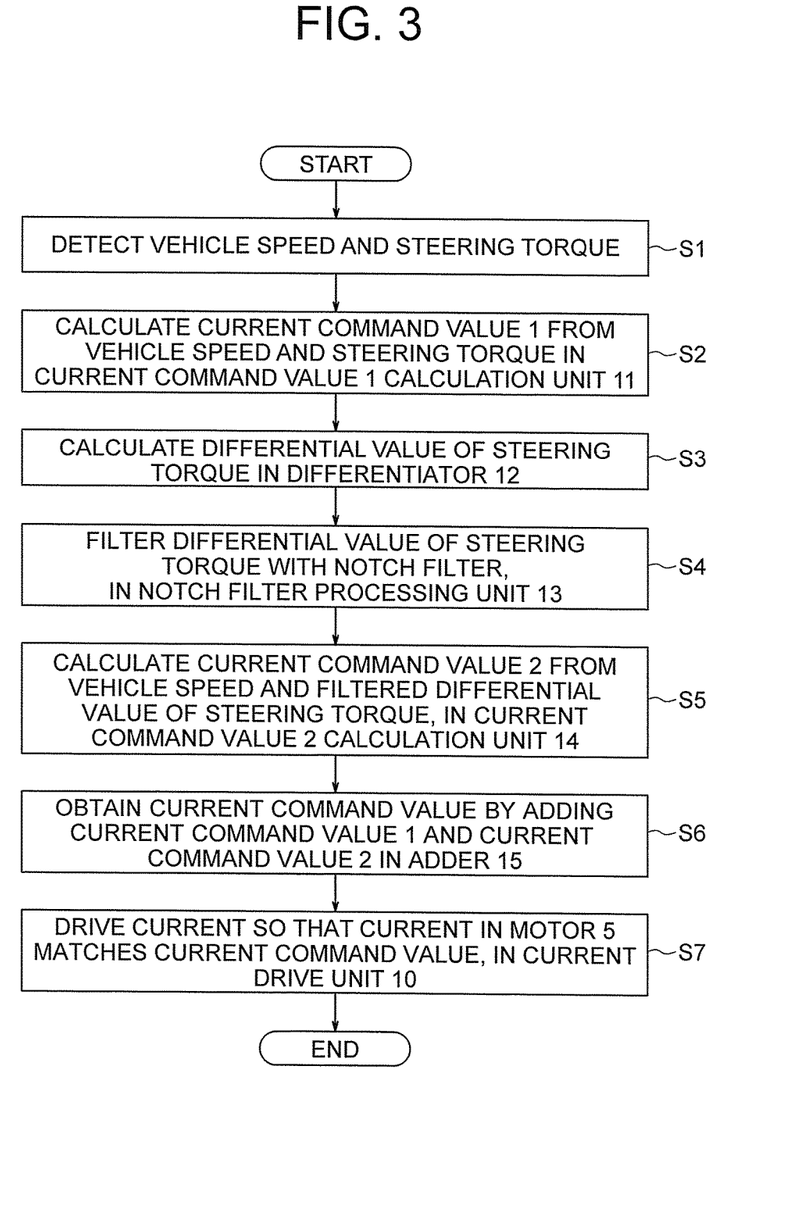
FIG. 3 is a flowchart showing a principal part of a steering control device according to the first embodiment of the invention.
Figure 4:
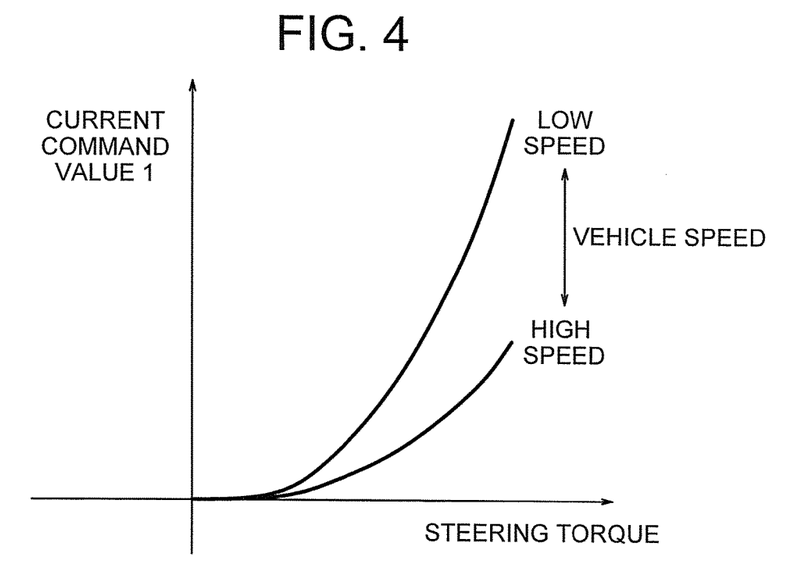
FIG. 4 is a diagram showing an assist map of a steering control device according to the first embodiment of the invention.
Figure 10:
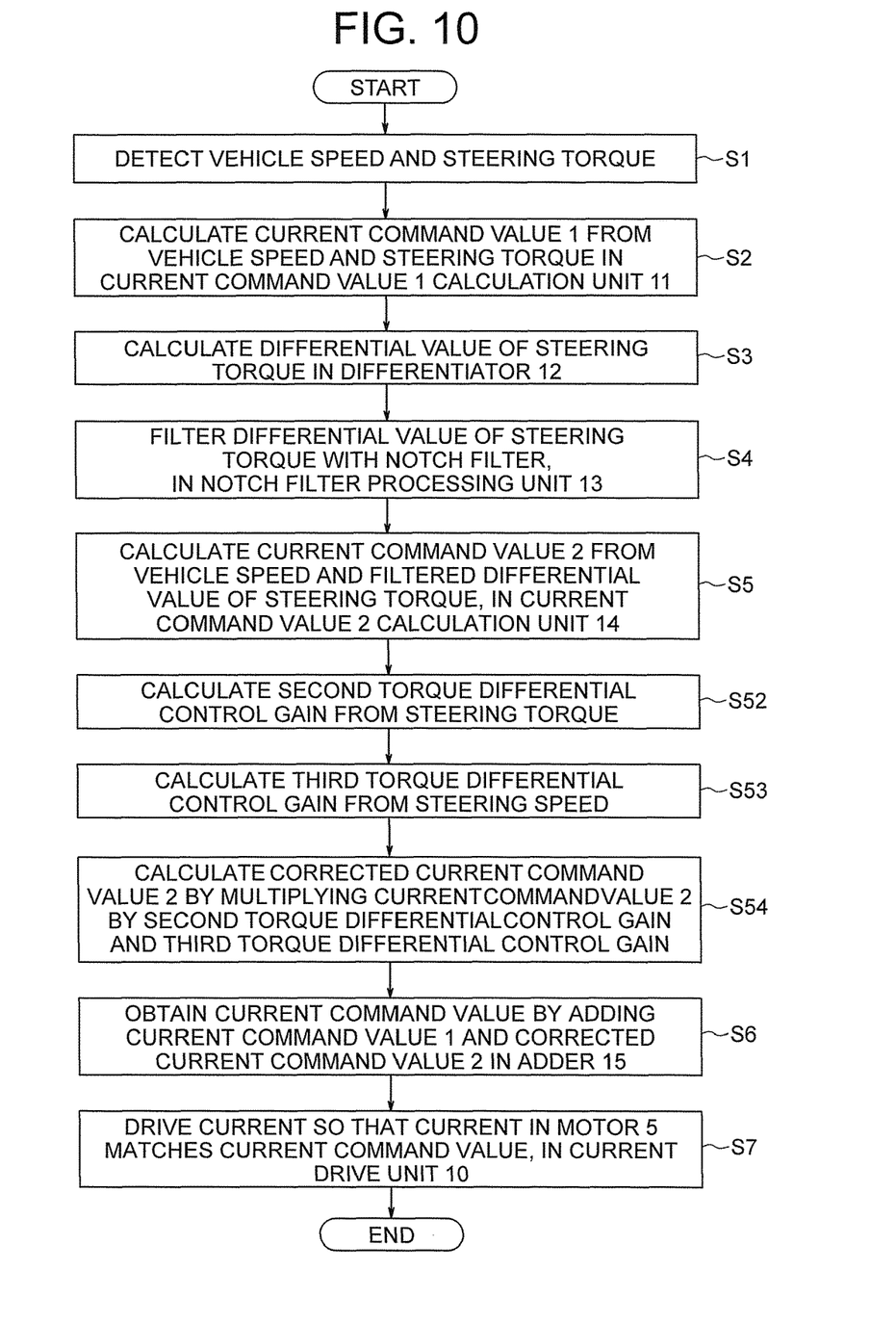
FIG. 10 is a flowchart showing a principal part of a steering control device according to a second embodiment of the invention.

In the flowchart in FIG. 10, steps S1 to S5 and S6 to S7 are the same as FIG. 3, and explanation thereof is omitted here. The difference between FIG. 10 and FIG. 3 is that, in FIG. 10, steps S52 to S54 are added between step S5 and step S6. Steps S52 to S54 configure a correction means which determines a correction gain for correcting the current command value 2, and uses the correction gain to correct the current command value 2.

In FIG. 10, in step S52, the steering torque from the torque sensor 4 is input to the current command value 2 calculation unit 14. The current command value 2 calculation unit 14 calculates a second torque differential control gain from the magnitude of the steering torque. The calculation method involves setting the second torque differential control gain to a smaller value, the greater the magnitude of the steering torque, for example. In other words, a second torque differential control gain map defining a relationship between the magnitude of the steering torque and the second torque differential control gain, so that the second torque differential control gain becomes smaller, the greater the magnitude of the steering torque, is created in advance, and a second torque differential control gain corresponding to the magnitude of the steering torque is read out from this second torque differential control gain map. Alternatively, a calculation formula whereby the second torque differential control gain becomes smaller, the greater the magnitude of the steering torque, is prepared in advance, and a second torque differential control gain is determined by this calculation formula. When the magnitude of the steering torque is taken to be x and the second torque differential control gain is taken to be y, the following expressions can be given.

$y = a_1 x^2 + b_1 x + c_1 (a_1 < 0)$  (second-order function)

$y = k_1 x (k_1 < 0)$  (directly proportional)

$y = k_2 / x (k_2 > 0)$  (inversely proportional)

In step S53, the current command value 2 calculation unit 14 calculates a third torque differential control gain from the magnitude of the steering speed. The calculation method involves setting the third torque differential control gain to a smaller value, the greater the magnitude of the steering speed, for example. In other words, a third torque differential control gain map defining a relationship between the magnitude of the steering speed and the third torque differential control gain, so that the third torque differential control gain becomes smaller, the greater the magnitude of the steering speed, is created in advance, and a third torque differential control gain corresponding to the magnitude of the steering speed is read out from this third torque differential control gain map. Alternatively, a calculation formula whereby the third torque differential control gain becomes smaller, the greater the magnitude of the steering speed, is prepared in advance, and a third torque differential control gain is determined by this calculation formula. If the magnitude of the steering speed is taken to be x and the third torque differential control gain is taken to be y, then the following expressions can be given.

$y = a_2 x^2 + b_2 x + c_2 (a_2 < 0)$  (second-order function)

$y = k_3 x (k_3 < 0)$  (directly proportional)

$y = k_4 / x (k_4 > 0)$  (inversely proportional)

The detection method for detecting the steering speed (steering speed detection unit) may be configured to calculate the steering speed by differentiating the detection value of the angle sensor which is installed on the steering wheel 1 and the motor 5, or may estimate the steering speed from the current and voltage of the motor 5.

In step S54, the current command value 2 calculation unit 14 corrects the current command value 2 by multiplying the current command value 2 by the second torque differential control gain and the third torque differential control gain.

In step S6, the current command value 1 and the corrected current command value 2 are added together to obtain a current command value in the adder 15.

The beneficial effect obtained by making the second torque differential control gain smaller, the larger the magnitude of the steering torque, will now be described. If the steering torque is large, then as shown in FIG. 4, the ratio of the change in the current command value 1 with respect to the change in the steering torque becomes large. In the region where this ratio is large, the beneficial effect based on the current command value 1 of suppressing the transmission, to the driver, of the road surface vibrations, is large, and therefore the current command value 2 is set to a small value and the stability of the control system can be further ensured.

Furthermore, in step S52, the second torque differential control gain may be set from the ratio of the amount of change in the current command value 1 to the amount of change in the steering torque. In other words, in a region where this ratio is greater than a predetermined value, the second torque differential control gain is set so as to make the current command value 2 smaller, whereby stability of the control system can be further ensured.

The beneficial effect obtained by making the third torque differential control gain smaller, the larger the magnitude of the steering speed, will now be described. When the steering speed is low, there is a tendency for the driver to sense the road surface vibrations more readily than when the steering speed is high. Therefore, it is possible to further ensure the stability of the control system by setting the current command value 2 to a small value in circumstances where the steering speed is high and the driver's sensitivity to road surface vibrations has fallen.

In the present embodiment, an example was described in which the current command value 2 is corrected by using both the second torque differential control gain and the third torque differential control gain, but the invention is not limited to this and it is also possible to correct the current command value 2 by using only the second torque differential control gain, or to correct the current command value 2 by using only the third torque differential control gain.

As described above, according to the present embodiment, it is possible to obtain similar beneficial effects to the first embodiment described above. Furthermore, the following beneficial effects are also obtained in the present embodiment.

In the present embodiment, there is provided a correction unit (S52, S54), which determines a corrective gain that is set in accordance with the steering torque detected by the torque sensor 4, and which uses this corrective gain to correct the current command value 2 calculated on the basis of the filtered differential value of the steering torque, and therefore the disturbance suppressing characteristics can be adjusted in accordance with the assist gain. In the region where the disturbance suppressing characteristics based on the current command value 1 can be ensured, the current command value 2 is reduced and stability is ensured.

Furthermore, in the present embodiment, there is provided a correction unit, which determines a corrective gain that is set in accordance with the ratio of the amount of change in the current command value 1 to the amount of change in the steering torque detected by the torque sensor 4, and which uses this corrective gain to correct the current command value 2 calculated on the basis of the filtered differential value of the steering torque, and therefore the disturbance suppressing characteristics can be adjusted in accordance with the assist gain. In the region where the disturbance suppressing characteristics based on the current command value 1 can be ensured, the current command value 2 is reduced and stability is ensured.

Furthermore, in the present embodiment, there are provided: a steering speed detection unit which detects the speed of steering of the steering wheel, and a correction unit, which determines a corrective gain that is set in accordance with the magnitude of the steering speed detected by the steering speed detection unit, and which uses this corrective gain to correct the current command value 2 calculated on the basis of the filtered differential value of the steering torque, and therefore the disturbance suppressing characteristics can be adjusted in accordance with the steering speed. By reducing the current command value 2 in a region where the steering speed is fast, it is possible to supress change in the steering torque when fast steering is performed.

Moreover, in the present embodiment, a correction unit is provided, which determines a first corrective gain that is set in accordance with the steering torque detected by the torque sensor 4, and a second corrective gain that is set in accordance with the magnitude of the steering speed detected by the steering speed detection unit, and which uses the first corrective gain and the second corrective gain to correct the current command value 2 calculated on the basis of the filtered differential value of the steering torque, and therefore it is possible to adjust the disturbance suppressing characteristics in accordance with the assist gain and the steering speed. In the region where the disturbance suppressing characteristics based on the current command value 1 can be ensured and where the steering speed is fast, the stability is ensured by reducing the current command value 2, and furthermore, the change in the steering torque when fast steering is performed can be suppressed.

REFERENCE SIGNS LIST

1 Steering wheel
2 Steering shaft
3 Turning wheel
4 Torque sensor
5 Motor
6 Speed reduction mechanism
7 Vehicle speed sensor
8 Current sensor
9 Control unit
10 Current drive unit
11 Current command value 1 calculation unit
12 Differentiator
13 Notch filter processing unit
14 Current command value 2 calculation unit

The invention claimed is:

1. A steering control device for assisting steering of a steering wheel of a vehicle by a driver, the steering control device comprising:
   a steering torque detection unit which detects a steering torque of the steering wheel;
   a vehicle speed detection unit which detects a vehicle speed of the vehicle;
   a motor which applies a steering assistance force to the steering wheel;
   a first current command value calculation unit which calculates a first current command value for the motor on the basis of the steering torque detected by the steering torque detection unit and the vehicle speed detected by the vehicle speed detection unit;
   a steering torque differentiation unit which calculates a differential value of the steering torque detected by the steering torque detection unit;
   a notch filter processing unit which has a notch filter and filters the differential value of the steering torque by using the notch filter;
   a second current command value calculation unit which calculates a second current command value for the motor, on the basis of the filtered differential value of the steering torque; and
   a current drive unit which drives the motor in such a manner that a value of a current flowing in the motor matches the sum of the first current command value and the second current command value,
   wherein, when a first crossover frequency represents the crossover frequency of control open loop characteristics of the steering control device as obtained when the second current command value calculation unit determines the second current command value by using a differential value of the steering torque which has not been filtered, instead of a differential value of the steering torque which has been filtered,
   a notch frequency of the notch filter is set to be larger than a mechanical resonance frequency of the steering control device and smaller than the first crossover frequency.

2. The steering control device according to claim 1, wherein the order of the notch filter is second-order.

3. The steering control device according to claim 1, further comprising a correction unit which determines a corrective gain that is set in accordance with the steering torque detected by the steering torque detection unit, and which uses the corrective gain to correct the second current command value calculated by the second current command value calculation unit on the basis of the filtered differential value of the steering torque.

4. The steering control device according to claim 1, further comprising a correction unit which determines a corrective gain that is set in accordance with the ratio of an amount of change in the first current command value to an amount of change in the steering torque detected by the steering torque detection unit, and which uses the corrective gain to correct the second current command value calculated by the second current command value calculation unit on the basis of the filtered differential value of the steering torque.

5. The steering control device according to claim 1, further comprising:
   a steering speed detection unit which detects a steering speed of the steering wheel; and
   a correction unit which determines a corrective gain that is set in accordance with a magnitude of the steering speed detected by the steering speed detection unit, and which uses the corrective gain to correct the second current command value calculated by the second current command value calculation unit on the basis of the filtered differential value of the steering torque.

6. The steering control device according to claim 1, further comprising:

a steering speed detection unit which detects a steering speed of the steering wheel; and a correction unit which determines a first corrective gain that is set in accordance with the steering torque detected by the steering torque detection unit and a second corrective gain that is set in accordance with the steering speed detected by the steering speed detection unit, and which uses the first corrective gain and the second corrective gain to correct the second current command value calculated by the second current command value calculation unit on the basis of the filtered differential value of the steering torque.

7. The steering control device according to claim 1, wherein the second current command value calculation unit calculates the second current command value by using the vehicle speed detected by the vehicle speed detection unit, as well as the filtered differential value of the steering torque.

* * * * *